(12) United States Patent
Jung et al.

(10) Patent No.: US 11,870,117 B2
(45) Date of Patent: Jan. 9, 2024

(54) SYSTEM AND METHOD FOR OPERATING FUEL CELL

(71) Applicants: Hyundai Motor Company, Seoul (KR); Kia Corporation, Seoul (KR)

(72) Inventors: Jae Kwon Jung, Gyeonggi-do (KR); Dong Hun Lee, Gyeonggi-Do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 219 days.

(21) Appl. No.: 17/532,126

(22) Filed: Nov. 22, 2021

(65) Prior Publication Data
US 2022/0352533 A1    Nov. 3, 2022

(30) Foreign Application Priority Data

May 3, 2021 (KR) .................. 10-2021-0057492

(51) Int. Cl.
| | | |
|---|---|---|
| *H01M 8/04992* | (2016.01) | |
| *H01M 8/04537* | (2016.01) | |
| *H01M 8/043* | (2016.01) | |
| *H01M 8/04858* | (2016.01) | |
| *B60L 58/30* | (2019.01) | |
| *H01M 8/04298* | (2016.01) | |

(52) U.S. Cl.
CPC ... *H01M 8/04992* (2013.01); *H01M 8/04611* (2013.01); *B60L 58/30* (2019.02); *H01M 8/043* (2016.02); *H01M 8/0488* (2013.01); *H01M 8/0491* (2013.01); *H01M 8/0494* (2013.01); *H01M 8/04298* (2013.01); *H01M 8/04552* (2013.01); *H01M 8/04559* (2013.01); *H01M 8/04582* (2013.01); *H01M 8/04589* (2013.01); *H01M 8/04619* (2013.01); *H01M 8/04873* (2013.01); *H01M 8/04902* (2013.01); *H01M 8/04932* (2013.01); *H01M 2250/20* (2013.01)

(58) Field of Classification Search
CPC ........ H01M 8/04992; H01M 8/04611; H01M 8/04298; H01M 8/0494; H01M 8/04619; H01M 8/043; H01M 8/04313; H01M 8/04537; H01M 8/04544; H01M 8/04552; H01M 8/04559; H01M 8/04574; H01M 8/04582; H01M 8/04589; H01M 8/04604; H01M 8/04694; H01M 8/04858; H01M 8/04865; H01M 8/04873; H01M 8/0488; H01M 8/04895; H01M 8/04902; H01M 8/0491; H01M 8/04925; H01M 2250/20; B60L 58/30

See application file for complete search history.

(56) References Cited

U.S. PATENT DOCUMENTS

2020/0328433 A1* 10/2020 Lee .................. B60L 58/30

FOREIGN PATENT DOCUMENTS

KR    10-2020-0119476 A    10/2020

\* cited by examiner

*Primary Examiner* — Matthew W Van Oudenaren
(74) *Attorney, Agent, or Firm* — Fox Rothschild LLP (57) ABSTRACT

A system for operating a fuel cell includes a controller configured to derive an output limit value of the fuel cell through an interval average value corresponding to an average of output values of the fuel cell for a designated time and a cumulative average value corresponding to an average of the output values of the fuel cell until the current point in time after starting to operate the fuel cell, and to control operation of the fuel cell based on the derived output limit value.

15 Claims, 5 Drawing Sheets

SYSTEM AND METHOD FOR OPERATING FUEL CELL

CROSS-REFERENCE TO RELATED APPLICATION

This application claims under 35 U.S.C. § 119(a) the benefit of Korean Patent Application No. 10-2021-0057492, filed on May 3, 2021 in the Korean Intellectual Property Office, the entire contents of which are incorporated herein by reference.

BACKGROUND

1. Technical Field

The present disclosure relates to a system and method for operating a fuel cell in which, when a fuel cell system is operated, not only real-time output data is used but also the output limit of the fuel cell is variably used in consideration of a cumulative time of use and a degree of generated power in each time section, so as to understand a state of the fuel cell which is not detectable through the real-time data, and to increase durability of the fuel cell due to more stable operation of the fuel cell.

2. Description of the Related Art

In general, output limit technology of a fuel cell system is implemented by real-time conditions of a vehicle, such as a temperature of coolant, an ambient temperature, a battery charging limit power value, etc. In such output limit technology, a limit value is effective in a beginning of life (BOL) state of the fuel cell system, but it is difficult to apply the same limit value in an end of life (EOL) state of the fuel cell system due to durability degradation of the fuel cell system.

Further, as the fuel cell system is applied to various applications, such as commercial vehicles, airplanes, ships, etc., the fuel cell system applied to these applications requires higher durability than the fuel cell system applied to passenger vehicles, for example. Therefore, efforts to increase durability of the fuel cell system in spite of a loss of fuel cell output are required in commercial vehicles and other applications, compared to the output and durability of the fuel cell system in passenger vehicles.

In order to satisfy the requirements in such a situation, the fuel cell system requires a function of limiting output in consideration of durability, and requires a technique which operates the fuel cell system under evaluated conditions in consideration of durability of the fuel cell system in advance without limiting the output of the fuel cell system through real-time system parameters.

The above information disclosed in the Background section is only for enhancement of understanding of the background of the disclosure and should not be interpreted as conventional technology that is already known to those skilled in the art.

SUMMARY

Therefore, the present disclosure provides a system and method for operating a fuel cell in which, when a fuel cell system is operated, not only real-time output data is used but also the output limit of the fuel cell is variably used in consideration of a cumulative time of use and a degree of generated power in each time section, so as to understand a state of the fuel cell which is not detectable through the real-time data, and thus to increase durability of the fuel cell due to more stable operation of the fuel cell.

In accordance with an aspect of the present disclosure, the above and other objects can be accomplished by the provision of a system for operating a fuel cell, the system including a controller configured to derive an output limit value of the fuel cell through an interval average value corresponding to an average of output values of the fuel cell for a designated time and a cumulative average value corresponding to an average of the output values of the fuel cell until a current point in time after starting to operate the fuel cell, and to control operation of the fuel cell based on the derived output limit value.

The interval average value may be a moving average value of the output values of the fuel cell.

The controller may be configured to perform a plurality of output limit modes, and the output limit value may be set differently depending on each of the output limit modes.

The output limit modes may include a first mode, a second mode, and a third mode, and the controller may select the first mode or the second mode through the interval average value and calculate the output limit value depending on the selected mode.

The output limit modes may include a first mode, a second mode, and a third mode, and the controller may convert the fuel cell into the second mode when the interval average value in the first mode is equal to or greater than a first reference value.

The controller may convert the fuel cell into the first mode when, in the second mode, a reference time after conversion into the second mode is equal to or longer than a first reference time.

The output limit modes may include a first mode, a second mode, and a third mode, and the controller may convert the fuel cell into the third mode when the interval average value in the first mode or the second mode is equal to or greater than a second reference value.

The controller may convert the fuel cell into the third mode when, in the first mode or the second mode, a reference time until the current point in time after starting to operate the fuel cell is equal to or longer than a second reference time and the cumulative average value is equal to or greater than the second reference value.

The controller may return the fuel cell to the first mode or the second mode when, in the third mode, the cumulative average value is decreased to a third reference value or less.

The controller may variably derive the output limit value of the fuel cell through a parameter accumulated by use of the fuel cell.

The output limit value of the fuel cell may be decreased as a parameter accumulated by use of the fuel cell is increased.

The controller may be configured to provide a plurality of cycle sections divided by a parameter accumulated by use of the fuel cell, and the output limit value may be set differently depending on each of the cycle sections.

The parameter may be a cumulative amount of hydrogen consumed of the fuel cell.

The parameter may be any one of a cumulative power generation capacity of the fuel cell, a cumulative amount of water generated by the fuel cell, or a cumulative amount of air consumed of the fuel cell.

In accordance with another aspect of the present disclosure, there is provided a method for operating a fuel cell, the method including: deriving, by a controller, an interval average value corresponding to an average of output values of the fuel cell every designated time; deriving, by the controller, a cumulative average value corresponding to an average of the output values of the fuel cell until a current point in time after starting to operate the fuel cell; deriving, by the controller, an output limit value of the fuel cell through the interval average value and the cumulative average value; and controlling, by the controller, operation of the fuel cell based on the derived output limit value.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Specific structural or functional descriptions in embodiments of the present disclosure set forth in the description which follows will be exemplarily given to describe the embodiments of the present disclosure. However, the present disclosure may be embodied in many alternative forms, and should not be construed as being limited to the embodiments set forth herein. Hereinafter, reference will now be made in detail to the preferred embodiments of the present disclosure, examples of which are illustrated in the accompanying drawings.

Figure 1:
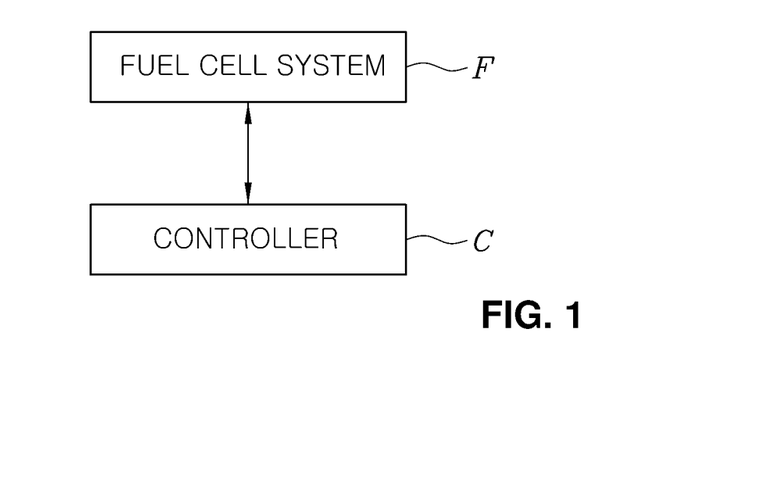
FIG. 1 is a block diagram of a system for operating a fuel cell according to one embodiment of the present disclosure.
Figure 2:
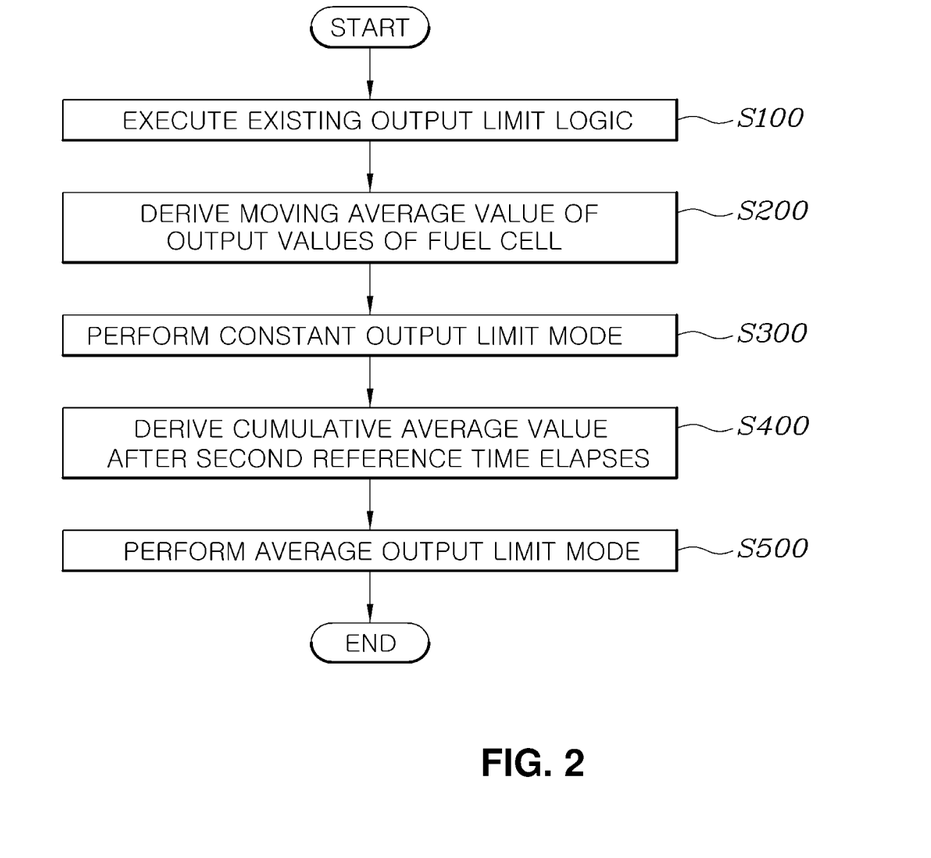
FIG. 2 is a flowchart representing a method for operating a fuel cell according to one embodiment of the present disclosure.
Figure 3:
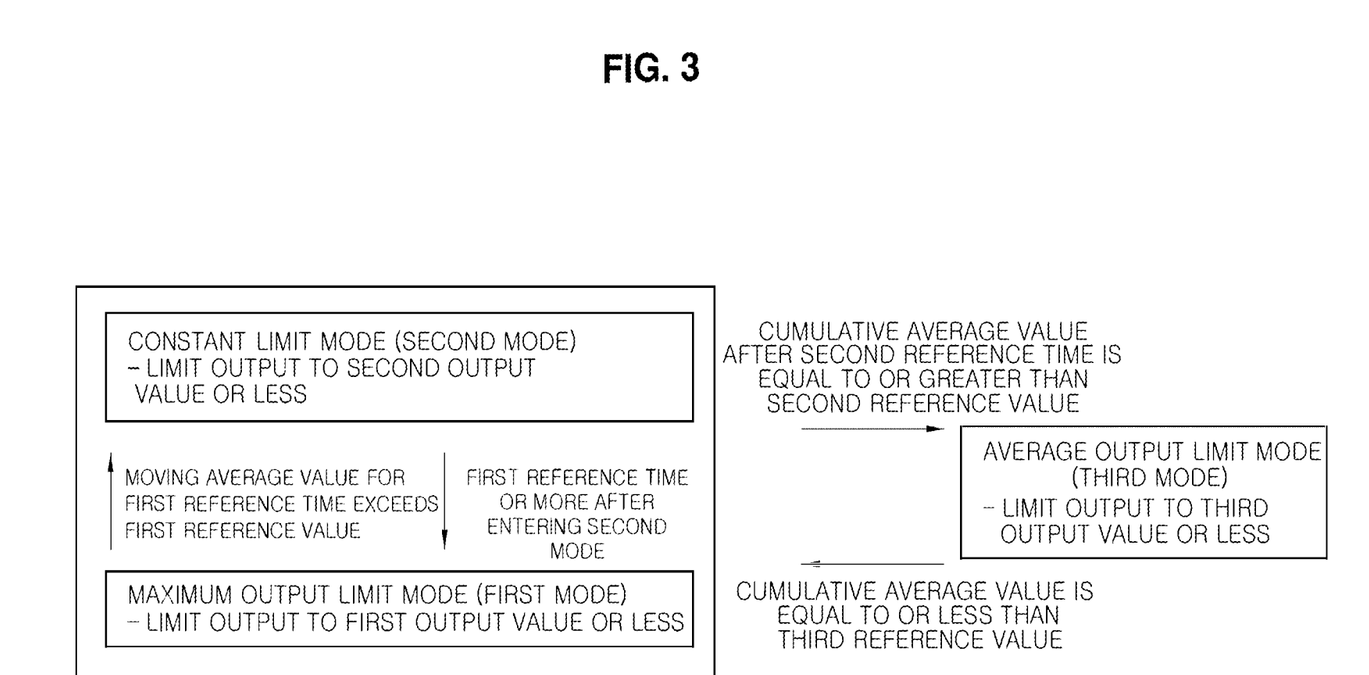
FIGS. 3 and 4 are views illustrating respective modes of the system according to one embodiment of the present disclosure.
Figure 4:
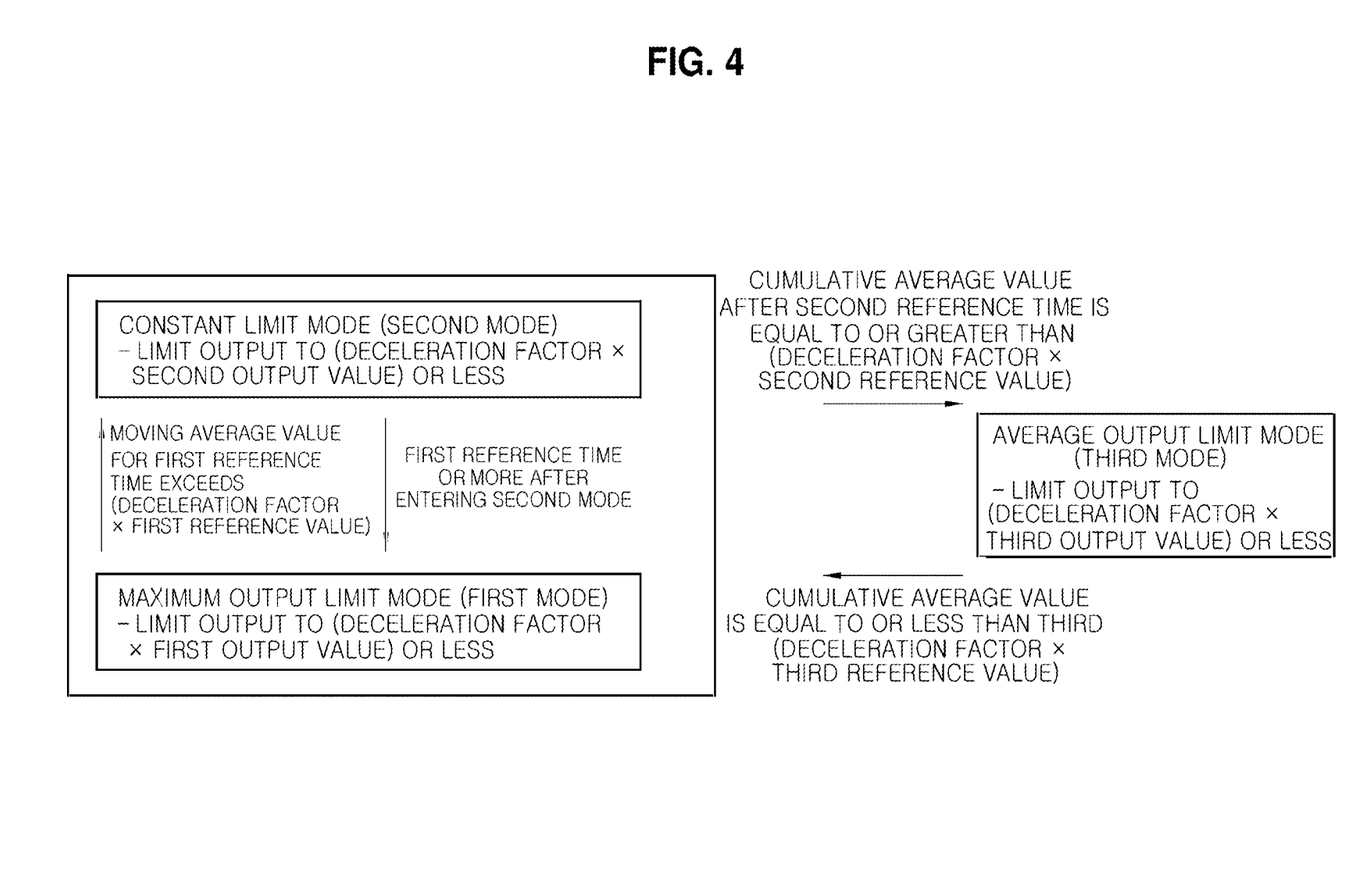
Figure 5:
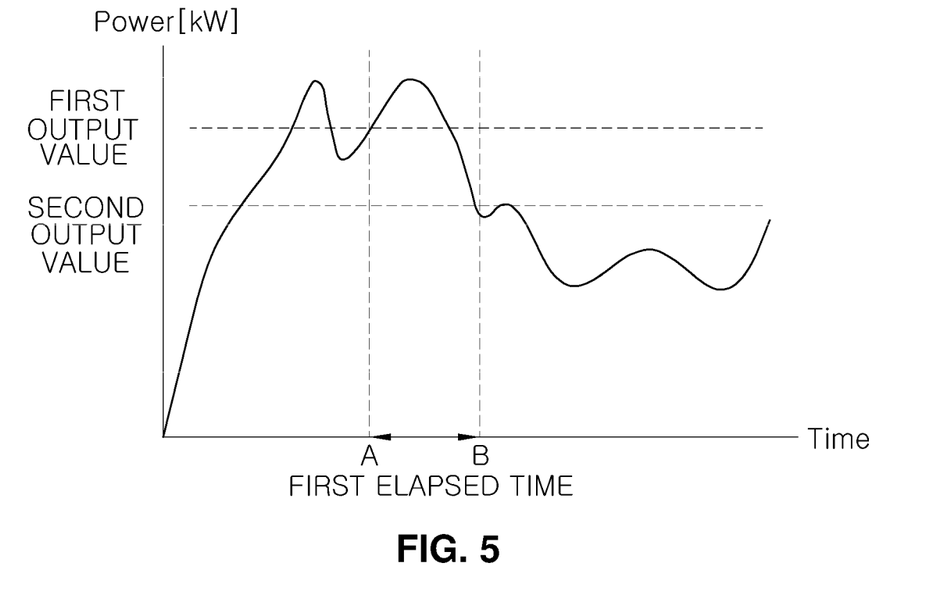
FIGS. 5 and 6 are graphs representing output of the fuel cell by application of the system according to one embodiment of the present disclosure.
Figure 6:
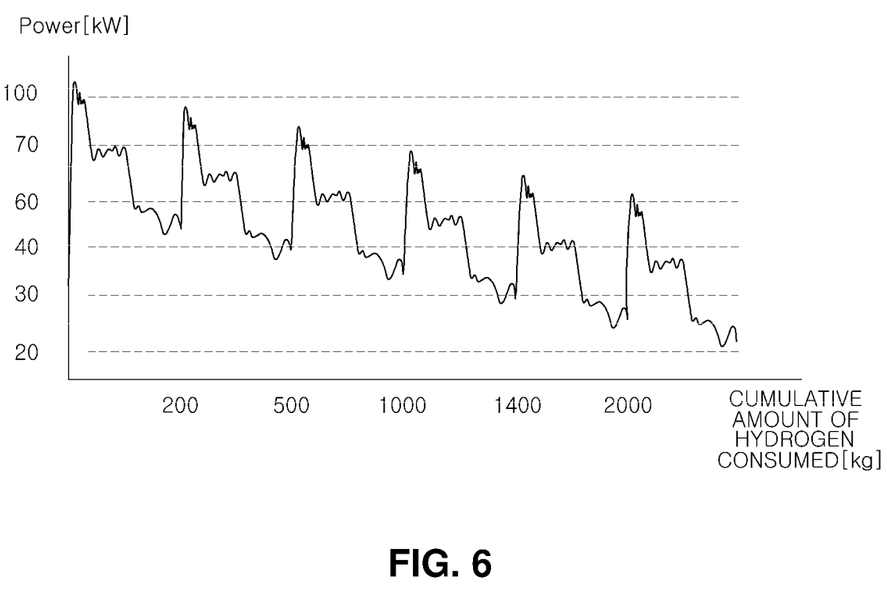

FIG. 1 is a block diagram of a system for operating a fuel cell according to one embodiment of the present disclosure, FIG. 2 is a flowchart representing a method for operating a fuel cell according to one embodiment of the present disclosure, FIGS. 3 and 4 are views illustrating respective modes of the system according to one embodiment of the present disclosure, and FIGS. 5 and 6 are graphs representing the output of the fuel cell by application of the system according to one embodiment of the present disclosure.

FIG. 1 is a block diagram of a system for operating a fuel cell according to one embodiment of the present disclosure, and when an output of the fuel cell is limited using the system, the system includes a controller C configured to control operation of the fuel cell according to an output limit value derived by processing data based on information transmitted from an input unit, and a fuel cell system F configured to transmit information about the fuel cell, such as the current output of the fuel cell and a cumulative amount of hydrogen consumed, etc., to the controller C. The fuel cell system F receives information about the fuel cell from a sensor and transmits a signal to the controller C, and the controller C executes logic for deriving the output limit value by performing calculation through the received signal and transmits the output limit value to a fuel cell DC-DC converter (FDC) so as to control the output of the fuel cell.

Such a system for operating the fuel cell is an upper-level system which receives information about the fuel cell and issues a command to dynamically or statically limit the output of the fuel cell so as to overcome performance degradation and durability degradation the fuel cell caused by use of the fuel cell. For example, in case that the controller C dynamically limits the output of the fuel cell, the controller C changes the maximum output of the fuel cell whenever each condition is satisfied, i.e., the dynamically changed output of the fuel cell, a state of charge (SOC) or a state of health (SOH) of the fuel cell, or a temperature of coolant is excessively lower or higher than a designated reference value. That is, the dynamic output limit is control of the limit of the maximum output of the fuel cell in the state of matching a change in a parameter 1:1 or being interlocked with the change in the parameter. On the other hand, in case of static output limit, when each condition is satisfied, the maximum output limit of the fuel cell may be limited while being maintained at a constant output. A system for operating a fuel cell such that the maximum output of the fuel cell dynamically matches a real-time parameter or be interlocked with the real-time parameter through the dynamic output limit method may not sufficiently consider durability degradation of the fuel cell generated by continuous exposure of the fuel cell to a high output section. Particularly, this system is not appropriate in applications (e.g., commercial vehicles, airplanes, or ships) requiring a longer operable time of the fuel cell.

Therefore, in order to apply the system to a vehicle or an application which must further consider durability degradation of a fuel cell, among vehicles and applications provided with fuel cells, an output limit value may be derived by adopting parameters evaluated in consideration of durability of the fuel cell. Therefore, the present disclosure is configured to control an output of a fuel cell through parameters evaluated in consideration of durability of the fuel cell.

FIG. 1 is a block diagram of a system for operating a fuel cell according to one embodiment of the present disclosure, and in particular, the system according to the present disclosure includes the controller C configured to derive the output limit value of the fuel cell through an interval average value which is an average of the output values of the fuel cell for a designated time, and a cumulative average value which is an average of the output values of the fuel cell until the current point in time after starting to operate the fuel cell, and to control operation of the fuel cell based on the derived output limit value.

In the present disclosure, the interval average value of the output values of the fuel cell and the cumulative average of the output values of the fuel cell are used as determination criteria for the output limit of the fuel cell. In the fuel cell, because excessive output of the fuel cell may increase danger of degradation, evaluation of durability of the fuel cell may be performed based on an output of the fuel cell, among various parameters. However, when the durability of the fuel cell is evaluated based on only any one of the temporary output of the fuel cell or the average output of the fuel cell for a long period of time, it is not easy to simultaneously determine a degree of degradation in a specific situation and a degree of degradation in an overall situation. Therefore, the interval average value is used when the output of the fuel cell is temporarily increased, and the cumulative average is used when the fuel cell is degraded due to use thereof for a long period of time.

In particular, the interval average value and the cumulative average value mean average values of the outputs of the fuel cell for a designated time using an output value and a time value, which are considered variables measured from the fuel cell, and are parameters which are different in terms of a range of time for calculating the corresponding average. The reason why the concept of the time average values of the outputs of the fuel cell is used is that, by excluding conventional parameters (the SOC, the SOH, and the temperature of coolant) measured by other apparatuses than the fuel cell, the system is capable of being universally applied to specific vehicles or specific applications (e.g., passenger vehicles, commercial vehicles, trams, airplanes, ships, etc.), which are designed so as to be suitable for other apparatuses or operating systems thereof.

Particularly, the interval average value and the cumulative average value, which are time average values, are parameters for more accurately evaluating a criterion for determining durability degradation of the fuel cell, i.e., whether or not the output of the fuel cell deviates from a high output section. Conventionally, when a fuel cell is operated at a designated high output or more for a designated time, it is determined that durability of the fuel cell is degraded. However, in this case, it is not clear whether or not the moment whenever the output of the fuel cell is less than a specific output regardless of time is determined as a break time, or whether or not a designated time from when the output of the fuel cell is decreased to less than a designated high output to when the output of the fuel cell again reaches the designated high output is regarded as the break time. Further, due to such unclearness, the output limit is excessively tuned because of characteristics of parameters, such as time and output, which are dynamically greatly changed in response to a user demand. This means that it takes much time and effort to extract meaningful data for limiting the output of the fuel cell. Therefore, the interval average value and the cumulative average value adopted in the present disclosure are variables which solve unclearness of a criterion for limiting the output of the fuel cell, which is dynamically changed, and minimize input of resources thereby.

FIG. 5 is a graph representing the output of the fuel cell by application of the system according to one embodiment of the present disclosure. The graph represents the output of the fuel cell by application of the system according to the present disclosure, which includes the controller C configured to derive the output limit value of the fuel cell through an interval average value which is an average of the output values of the fuel cell for a designated time, and a cumulative average value which is an average of the output values of the fuel cell until the current point in time after starting to operate the fuel cell, and to control operation of the fuel cell based on the derived output limit value. In particular, the interval average value may be the moving average value of the output values of the fuel cell. That is, the interval average value corresponds to the average of the output values of the fuel cell in a section for a designated time retroactively from the current point in time, and is updated continuously.

Further, in the graph of FIG. 5, the horizontal axis indicates time, and the vertical axis indicates an output value. The interval average value refers to the average of the output values of the fuel cell for a designated time, and is used as the moving average. When the average of the output values of the fuel cell for a first reference time until a designated point in time A retroactively from the current point in time B, i.e., the moving average, is equal to or greater than a first reference value, the controller C controls operation of the fuel cell based on an output limit value derived as being different from the previous output limit value. That is, FIG. 5 represents a time-output graph in which, when the moving average value for the first reference time is equal to or greater than the first reference value, operation of the fuel cell is controlled based on a second output value which is derived as being different from a first output value which is a threshold output value for limiting the previous maximum output.

Here, the moving average value refers to the average value of data for until a designated point in time retroactively from the current point in time. That is, the moving average value is a variable in which the previous output values are considered together with time, and a time for which the fuel cell was exposed to a high output section based on the current state of the fuel cell is sufficiently reflected in the moving average value. For example, in the case that a user intends to accelerate a vehicle so that the output of the fuel cell is excessively changed for only a very short period of time, when only the current output of the fuel cell is considered, operation of the fuel cell must be controlled in the state in which the output limit value is decreased or increased, but on the contrary, when only time is considered, the output limit value must not be set.

In the inverse situation, for example, the user continuously operates the fuel cell so as to produce a high output and then operates the fuel cell so as to maintain the output of equal to or less than the output limit value for a very long time in consideration of the output limit of the fuel cell. In this case, contrary to the former case, when only the current instantaneous output or the long time for which the fuel cell was exposed to the high output section in the past is considered, the output limit value may be adjusted, but when only the current state in which the fuel cell enters the low output section is considered, the output limit value may not be adjusted. In the output limit of the fuel cell based on the moving average value, even though the output value is suddenly decreased or continuously maintains a high output value of equal to or less than the output limit value, output limit of the fuel cell is not performed in response to sudden output fluctuation, and only when it is determined that the fuel cell maintains a designated break section deviating from the high output section, the output limit value is adjusted. Therefore, the output limit of the fuel cell based on the moving average value allows noise or excessive delay, generated when the time for which the fuel cell was previously exposed to the high output section is determined based on the conventional variables, to be removed, thereby being capable of performing accurate and rapid determination and thus continuously monitoring and managing durability degradation of the fuel cell.

Further, the moving average value may not only be a simple moving average (SMA), as described above, but also be a weighted moving average (WMA) calculated by assigning a higher weighting factor to a time closer to the current point in time, an end point moving average (EPMA), or an exponential moving average (EMA) calculated by assigning a higher weighting multiplier to a time closer to the current point in time. These variables may be selectively used depending on a vehicle (or an application) which more sensitively reacts to a recent output change rather than the output change before a designated time, compared to the SMA. For example, compared to a general vehicle to which the SMA is applied, in case of a vehicle to which WMA, EPMA or EMA is applied, when a user suddenly increases or decreases the output of the fuel cell, the output limit value may be more sensitively changed. Therefore, when these variables are applied, a system optimized for a vehicle requiring greater acceleration performance than the general vehicle to which the SMA is applied may be provided.

FIG. 3 is a view illustrating respective modes of the system according to one embodiment of the present disclosure. The controller C may be configured to perform a plurality of output limit modes, and the output limit value may be set differently depending on each of the output limit modes. That is, the output limit value is set in stages, and upon determining that the time for which the fuel cell was exposed to the high output section is long, the fuel cell may continuously maintain a constant output while deviating from the high output section. Thereby, logic for improving durability performance while decreasing acceleration performance for a short period of time compared to the conventional method so as to be appropriate for a vehicle or an application optimized for the logic may be executed. Further, through the modes shown in FIG. 3, a user may easily recognize a difference between output limit degrees in a section requiring acceleration performance (particularly, in an initial stage of a driving cycle) and a section not requiring acceleration performance. For example, on the assumption that there is no system according to the present disclosure, the user may excessively continuously require acceleration performance in the state of not recognizing a section in which high output for acceleration is not feasible. Thereby, when the output limit mode is continuously turned on and off, harmful effects, such as degradation of performance and durability and error occurred in the conventional system, are unavoidable. However, the system according to this embodiment of the present disclosure is advantageous in that a user may sufficiently predict a section in which high output for acceleration is feasible and a section in which high output for acceleration is not feasible. That is, the user may require acceleration performance only in the section in which high output for acceleration is feasible, and may recognize that acceleration performance is not capable of being excessively required in the section in which high output for acceleration is not feasible and then adjust the output of the fuel cell, thereby preventing harmful effects, such as error encountered in the conventional system.

FIG. 3 is a view illustrating the respective modes of the system according to one embodiment of the present disclosure, and in particular, the output limit modes may include a first mode, a second mode, and a third mode, and the controller C may select the first mode or the second mode through the interval average value and calculate an output limit value depending on the selected mode. The output limit modes may include the first mode, the second mode, and the third mode, and the controller C may convert the first mode into the second mode when the interval average value in the first mode is equal to or greater than the first reference value.

That is, when the interval average value is equal to or greater than a designated value, the controller C may select a mode in which the output limit value is lower or convert the current mode into this mode, and when the interval average value is equal to or less than the designated value, the controller C may select a mode in which the output limit value is higher or convert the current mode into this mode. FIG. 3 exemplarily illustrates a maximum output limit mode as the first mode, and a constant output limit mode as the second mode. Here, the maximum output limit mode is an output limit mode before the system according to the present disclosure is applied, and the maximum output of the fuel cell is limited to the first output value or less in real time in response to real-time fluctuation of parameters. Further, the constant output limit mode is a mode in which, upon determining that the fuel cell was exposed to the maximum output for a designated time, the maximum output of the fuel cell is limited to the second output value of less for a designated time in contrast to the maximum output limit mode. Particularly, when the lower output limit value is set in the constant output limit mode rather than in the maximum output limit mode, the cooling time of the fuel cell which is raised to a high temperature and gets dry after entering the high output section may be sufficiently ensured, and thereby, durability degradation of the fuel cell may be prevented.

Further, the controller C may convert the second mode into the first mode when a reference time after conversion into the second mode is equal to or longer than the first reference time. That is, the constant output limit mode may be a mode for securing a designated recovery time of the fuel cell in response to exposure of the fuel cell to the maximum output. Therefore, after the designated recovery time from a point in time when, upon determining that the interval average value is equal to or greater than the designated value, the maximum output limit mode is converted into the constant output limit mode in which the output limit value is lower than that in the maximum output limit mode, the fuel cell may enter the first mode again so as to secure acceleration performance. Otherwise, when the user increases the interval average value to the first reference value or greater, the first mode may be converted into the second mode again. Therefore, the system according to this embodiment of the present disclosure may satisfy both acceleration performance for a designated time and durability performance required by specific vehicles depending on user needs. Further, after conversion between the first and second modes, the user gets feedback so as to reduce acceleration performance even in the first mode in consideration of the output limit.

Further, combination between an acceleration section and a recovery section may more actively prevent durability degradation. For example, in the acceleration section corresponding to the first mode, in case of a vehicle, such as a commercial vehicle, or an application requiring durability, the dynamics of motor output may be received in a battery having a sufficient state of charge (SOC), and the fuel cell may produce a constant output as remainder of necessary power, thereby being capable of reducing exposure of the fuel cell to the high output section. In the recovery section corresponding to the second mode, the fuel cell may maintain a constant output lower than the output in the first mode so as to secure durability performance, and may simultaneously charge the battery in advance so as to sufficiently prepare for durability degradation expected when the fuel cell enters the high output section. FIG. 3 represents the first reference time as the recovery time.

The controller C may convert the first mode or the second mode into the third mode when the cumulative average value in the first mode or the second mode is equal to or greater than a second reference value. Further, the controller C may convert the first mode or the second mode into the third mode when a reference time until the current point in time after starting to operate the fuel cell is equal to or longer than a second reference time and the cumulative average value is equal to or greater than the second reference value. Further, the controller C may return from the third mode to the first mode or the second mode when the cumulative average value is lowered to a third reference value or less.

Here, the third mode may be an average output limit mode. The average output limit mode may be a mode in which the output of the fuel cell is further limited or further relieved by the cumulative average value corresponding to the average of the output values of the fuel cell until the current point in time after starting to operate the fuel cell. Here, the cumulative average value, which is the average of the output values of the fuel cell until the current point in time after starting to operate the fuel cell, is a parameter in which degradation of durability performance throughout all the sections of the driving cycle is reflected, in contrast to the interval average value. That is, the interval average value is an index by which a degree of exposure of the fuel cell to the high output section until a designated time retroactively from the current point in time is determined, and in contrast, the cumulative average value is an index in which degradation of the temperature adjustment ability of the system due to long-term operation of the fuel cell is reflected even though the high output of the fuel cell is not maintained recently.

When the fuel cell is operated for a long period of time, the performance of coolant is degraded, and thus the overall system including the fuel cell is continuously in the high-temperature state. When the fuel cell enters the conventional high output section again in this state, durability degradation of the fuel cell, which already gets dry, gets worse. This may not be prevented only with the short recovery time evaluated through the interval average value, and may be prevented with a reinforced output limit value and a long recovery time evaluated through the cumulative average value. Therefore, the average output limit mode through the cumulative average value serves to more accurately warn of the danger of durability degradation of the overall system due to long-term operation of the fuel cell. Particularly, when the system is applied to a vehicle, such as a commercial vehicle, or an application requiring long-term driving or a long lifespan, compared to a general passenger vehicle, durability improvement effect may be maximized. FIG. 3 represents the cumulative average value as the second reference value.

Consequently, the system according to this embodiment of the present disclosure may control operation of the fuel cell by simultaneously reflecting a degree of temporary exposure of the fuel cell to the high output section between the first mode and the second mode, and reflecting a degree of cumulative exposure of the fuel cell to the high output section between the first mode (or the second mode) and the third mode. This system may primarily prevent durability degradation by rapidly providing the recovery time in response to temporary entry to the high output section, and may secondarily prevent durability degradation in consideration of the more vulnerable state of the fuel cell to durability degradation due to high-output operation of the fuel cell for a long period of time.

Further, as shown in FIG. 3, the system may be set so that the fuel cell is not capable of being converted into the third mode before the second reference time. That is, the output limit value may be set in the first mode or the second mode which has the recovery time while requiring acceleration performance, and the fuel cell may be converted into the third mode which further limits the output limit values after the second reference time. As shown in FIG. 3, a user acceleration performance request is secured only for the first reference time before the second reference time, and the user acceleration performance request is completely excluded before the overall system is sufficiently cooled after the second reference time. Therefore, durability of a vehicle, such as a commercial vehicle, or an application requiring long-term driving or a long lifespan rather than acceleration performance may be further satisfied. Further, the user gets feedback about such short-term and long-term output limits and thus minimizes wasteful acceleration of the vehicle causing degradation of durability performance during long-term operation, and thereby, the system may be further stabilized.

Here, the third reference value corresponding to a tuning point at which the third mode is returned to the first mode or the second mode may be set to the accumulative average value of the output values of the fuel cell. Of course, the third reference value may be set to the recovery time which is a third reference time (which is equal to or longer than the first and second reference times), or may be set to the interval average value as the output limit (which is equal to or less than the first reference value). As a result, a degree of the output limit may be set so as to suit the needs of a specific vehicle or application. That is, the optimal point between the lifespan and the acceleration performance of a specific vehicle may be satisfied using not only the recovery time but also any one of the cumulative average value or the moving average value, which is recoverable, or a combination of variables. FIG. 3 represents the third reference value as the cumulative average value of the output values of the fuel cell.

FIGS. 3 and 4 are views illustrating the respective modes of the system according to one embodiment of the present disclosure. As shown in FIGS. 3 and 4, the controller C may variably derive the output limit value of the fuel cell through the parameter accumulated according to use of the fuel cell.

In particular, the output limit value of the fuel cell may be decreased as the parameter cumulated according to use of the fuel cell is increased.

The output limit value described herein may include the output limit value derived through the conventional maximum output limit mode or the output limit mode derived through the constant output limit mode or the average output limit mode described in the present disclosure. Further, the parameter accumulated according to use of the fuel cell may include a parameter which is increased by accumulation or a parameter which is decreased by accumulation. For example, a driving period, a cumulative amount of hydrogen consumed, a cumulative amount of air consumed, and a cumulative amount of water generated according to use of the fuel cell are parameters which are increased by accumulation. On the other hand, a ratio of the current voltage of the fuel cell system to the voltage of the fuel cell system with respect to a specific output in a beginning of life (BOL), the rate of the maximum hydrogen storage amount, and a current density to cyclic voltage are parameters which are decreased by accumulation according to use of the fuel cell. Here, use of the fuel cell includes not only generation of energy by consumption of hydrogen in the fuel cell but also work to maintain the existing functions of the general fuel cell, such as repair, replacement and regeneration of the fuel cell, or work to degrade the existing output performance of the fuel cell, such as failure, malfunction, overworking (or underworking) and abuse of the fuel cell.

It is most important that the system according to this embodiment of the present disclosure may set the output limit value of the fuel cell in consideration of output improvement or output decline due to cumulative use and repair of the fuel cell. This is particularly important in an end of life (EOL) state in which the power is declined. For example, even though the same fuel cell system is used, the fuel cell system may produce a maximum output of a constant level in the BOL state, but may produce a lower maximum output in the EOL state. Further, the fuel cell may produce an improved output by repair. However, when a fixed output limit value is applied without considering these aspects, the fuel cell is exposed to the high output section for a longer time and thus durability degradation thereof may rapidly proceed, or the fuel cell is limited to the low output section and may not thus exhibit acceleration performance. Therefore, the output limit value is changed in the state of being interlocked with parameters in which a change in the output of the fuel cell due to use or repair of the fuel cell is considered, and thus, an output limit may be redesigned so as to more actively prevent durability degradation than the fixed output limit value and to suit improved acceleration performance. That is, this embodiment of the present disclosure may provide the system for operating the fuel cell which may secure durability of the fuel cell and be optimized for the state of the fuel cell compared to the conventional output limit.

FIGS. 3 and 4 represent that the first reference value as the interval average value is multiplied by a deceleration factor of less than 1, the second reference value as the cumulative average value is multiplied by a deceleration factor of less than 1, and the third reference value as the cumulative average value is multiplied by a deceleration factor of less than 1. However, from the above point of view, the first reference time or the second reference time, which is the recovery time at which the fuel cell is converted into the second mode or the third mode in the state of being interlocked with the parameter accumulated by use of the fuel cell, may be extended (not shown). In this case, through a new output limit value set in consideration of the state of the fuel cell in which durability degradation is already on the way or the recovered state of the fuel cell, the user may secure a operable time of the fuel cell required by a specific vehicle or application and simultaneously predict the operable time of the fuel cell.

FIGS. 3 and 4 are views illustrating the respective modes of the system according to one embodiment of the present disclosure, and particularly, degrees of the increase or decrease in the output limit value in the respective modes of the system may be discrete or continuous. That is, when the ratio value of the new output limit value to the conventional output limit value is defined as a deceleration factor, the same deceleration factor may be applied per specific cycle section among a plurality of cycle sections divided by a parameter, or a deceleration factor which is increased or decreased in proportion to the parameter or based on other mathematical expression relationships may be applied.

For example, the parameter of FIG. 3 may be applied to a first cycle section, the parameter of FIG. 4 may be applied to a second cycle section, and the parameter which is multiplied by deceleration factors set for the respective sections may be discretely applied. Otherwise, the parameter of FIG. 3 may be a first specific value, the parameter of FIG. 4 may be a second specific value, and an output limit value, which is reduced compared to the output limit value of FIG. 3 in proportion to the second specific value or based on other mathematical expression relationships, may be derived and be continuously applied. The former case sets the same output limit due to durability degradation in a specific cycle section (particularly, a long-term use section), and may thus allow a user to sufficiently recognize and predict this section. The latter case allows a degree of durability degradation of a vehicle or an application to be sufficiently reflected through the parameter which is increased or decreased in real time, and may thus lengthen the operable time of the fuel cell.

FIG. 6 is a graph representing the output of the fuel cell by application of the system according to one embodiment of the present disclosure. Particularly, the controller C may perform a plurality of cycle sections divided by a parameter which is accumulated by use of the fuel cell, and may set different output limit values of the fuel cell in the respective cycle sections. In particular, the parameter may be a cumulative amount of hydrogen consumed of the fuel cell. Further, the parameter may be a cumulative power generation capacity of the fuel cell, a cumulative amount of water generated by the fuel cell, or a cumulative amount of air consumed of the fuel cell.

Here, FIG. 6 illustrates a graph in which the horizontal axis indicates the cumulative amount of hydrogen consumed of the fuel cell, and the vertical axis indicates the output of the fuel cell. Particularly, FIG. 6 represents that a new output limit value, which is reduced compared to the existing output limit value, is derived in a specific cycle section. As such, when the same output limit is discretely provided to the specific cycle section (particularly, the long-term use section) due to durability degradation in this cycle section, a user may sufficiently recognize and predict such lifespan decrease in the respective sections. Further, when the starting point of the specific cycle section is set prior to a point in time when lifespan decrease is expected, durability degradation in a specific vehicle may be prevented in advance through an output limit which is reinforced as a constant value.

Further, the cumulative amount of hydrogen consumed is an index in which the actual cumulative use of the fuel cell is reflected. In contrast, the conventional vehicles using fuel (including composite fuel including fossil fuels, such as gasoline, diesel, LPG and CNG) only as an energy source, use a driving time as a parameter for measuring the amount of fuel used in a fuel system. However, in vehicles (hybrid vehicles, hydrogen vehicles, etc.) using fuel and a battery (electricity) as energy sources, the driving time is not capable of appropriately reflecting a durability degradation state, as in the case that the vehicle is operated only by the battery in an idle state. Therefore, the cumulative amount of hydrogen consumed of the fuel cell may more actively reflect a substantial degree of output degradation, and durability performance of the fuel cell may be more stably improved by the output limit value of the fuel cell system interlocked with the cumulative amount of hydrogen consumed.

Further, the cumulative amount of hydrogen consumed of the fuel cell is an index which clearly indicates reduction of the average lifespan of fuel cells, compared to other indexes. The fuel cell has a life cycle in which durability of the fuel cell is decreased due to inner system degradation as the fuel cell is changed from the beginning of life (BOL) to the end of life (EOL) according to cumulative use of the fuel cell. Here, the boundary between the BOL and the EOL is not clear, and durability of the fuel cell is linearly or nonlinearly decreased throughout the life cycle. A variable indicating such a linear or nonlinear decease in durability of the fuel cell may be a parameter which is accumulated by use of the fuel cell. Other parameters, such as voltage drop to the BOL of the fuel cell, may be variables which are changed a little sensitively or nonlinearly changed in relationship with other variables. On the other hand, the cumulative amount of hydrogen consumed of the fuel cell is an average index which may sufficiently predict lifespan decrease due to cumulative use of the fuel cell and be linearly increased. Therefore, the cumulative amount of hydrogen consumed of the fuel cell may clearly indicate a degree of the lifespan decrease, which may be predicted by a user, and may more stably prevent durability degradation of the fuel cell depending on the output limit value derived based on the cumulative amount of hydrogen consumed of the fuel cell.

Further, although not shown, the parameter which is increased by accumulation according to use of the fuel cell may be a cumulative power generation capacity of the fuel cell, a cumulative amount of water generated by the fuel cell, or a cumulative amount of air consumed of the fuel cell. These parameters may be easily and accurately measured by various sensors which are substantially used in industries and by general consumers. Thereby, operation of the system may be more stably controlled by more accurately reflecting the current durability degradation state of the fuel cell.

FIG. 2 is a flowchart representing a method for operating a fuel cell according to one embodiment of the present disclosure, and the method according to the present disclosure includes deriving an interval average value which is an average of the output values of the fuel cell every designated time (S200), deriving a cumulative average value which is an average of the output values of the fuel cell until current point in time after starting to operate the fuel cell (S400), deriving the output limit value of the fuel cell through the interval average value and the cumulative average value (S300 and S500); and controlling operation of the fuel cell based on the derived output limit value.

In particular, in the method according to one embodiment of the present disclosure, the controller executes output limit logic applied to the conventional vehicle (or application) as in the maximum output limit mode, i.e., the first mode, described above with reference to FIGS. 3 and 4 (S100). Thereafter, the controller derives the interval average value which is the average of the output values of the fuel cell every designated time by receiving information about the designated time of the fuel cell and the output of the fuel cell for the designated time and performing calculation of the information (S200). Here, the interval average value may be a moving average value, as shown in FIGS. 3 and 4. Further, the interval average value may be a WMA, an EPMA or an EMA. Thereafter, the controller derives the output limit value through the interval average value. In this case, the controller may derive an output limit value, which is different from the output limit value derived through the conventional output limit logic, such as the second output value corresponding to the output limit value in the second mode, which is different from the first output value corresponding to the output limit value in the first mode, as shown in FIGS. 3 and 4, and then may perform the constant output limit mode corresponding to the second mode (S300). Further, the method may be return to performing the conventional limit logic, as in the case that first reference time elapses, as shown in FIGS. 3 and 4.

Thereafter (or at the same time or therebefore), the controller derives the cumulative average value which is the average of the output values of the fuel cell until the current point in time after starting to operate the fuel cell by receiving information about a time until the current point in time after starting to operate the fuel cell and the output of the fuel cell for this time and performing calculation of the information (S400). This operation may be performed after a designated time is delayed, as in the case that the second reference time elapses, as shown in FIGS. 3 and 4.

In this case, the controller may derive an output limit value, which is different from the output limit value derived through the conventional output limit logic, such as the third output value corresponding to the output limit value in the third mode, which is different from the output limit value in the first mode or the second mode, as shown in FIGS. 3 and 4, and then may perform the average output limit mode corresponding to the third mode (S500). Thereafter, the controller may terminate control of operation of the fuel cell. Accordingly, the method may further include returning to the first mode or the second mode when the cumulative average value is decreased to the third reference value or less or the reference time until the current point in time after starting to operate the fuel cell is equal to or longer than the third reference time which is a recovery time (not shown).

The present disclosure relates a system and method for operating a fuel cell, and more particularly to technology which limits the output of a fuel cell in consideration of durability degradation of the fuel cell so as to increase durability of the fuel cell in operation of a fuel cell system.

In general, the output limit technology of a fuel cell system was implemented by real-time conditions of a vehicle, such as the temperature of a coolant and an ambient temperature, a power value for limiting charging of the fuel cell, etc. The reason for this is that such conventional output limit technology was optimized for vehicle applications. Particularly, these real-time conditions of the vehicle are determined as values of factors which are greatly changed depending on a driving profile or are greatly influenced even by a small change. Therefore, when the same system is applied to another vehicle or application, durability of the system is greatly degraded and may not satisfy the operable time of the fuel cell required by the corresponding vehicle or application. Further, in order to apply the fuel cell system to the corresponding vehicle or application, an apparatus and system including the fuel cell system must be readjusted.

However, the system and method for operating a fuel cell according to the present disclosure not only use real-time output data but also vary an output limit of the fuel cell in consideration of a cumulative time of use and a degree of generated power in each time section when a fuel cell system is operated, thereby being capable of understanding a state of the fuel cell which is not detectable through the real-time data, and thus increasing durability of the fuel cell due to more stable operation of the fuel cell. Further, the system and method according to the present disclosure control the operation of the fuel cell using variables using the output of the fuel cell and time, thereby being capable of being widely applied to all vehicles or applications using the fuel cell system.

Further, the system and method according to the present disclosure more actively use the output limit of the fuel cell in consideration of a degree of cumulative use of the fuel cell based on the current durability degradation state of the fuel cell system, thereby being capable of understanding a durability state of the fuel cell and thus increasing durability of the fuel cell so as to satisfy the operable time of the fuel cell required by a corresponding vehicle or application.

As is apparent from the above description, a system and method for operating a fuel cell according to the present disclosure not only use real-time output data but also vary an output limit of the fuel cell in consideration of a cumulative time of use and a degree of generated power in each time section when a fuel cell system is operated, thereby being capable of understanding a state of the fuel cell which is not detectable through the real-time data, and thus increasing durability of the fuel cell due to more stable operation of the fuel cell.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A system for operating a fuel cell, the system comprising:
   a controller configured to derive an output limit value of the fuel cell through an interval average value corresponding to an average of output values of the fuel cell for a designated time and a cumulative average value corresponding to an average of the output values of the fuel cell until a current point in time after starting to operate the fuel cell, and to control operation of the fuel cell based on the derived output limit value.

2. The system according to claim 1, wherein the interval average value is a moving average value of the output values of the fuel cell.

3. The system according to claim 1, wherein the controller is configured to perform a plurality of output limit modes, and the output limit value is set differently depending on each of the output limit modes.

4. The system according to claim 3, wherein:
   the output limit modes comprise a first mode, a second mode, and a third mode; and
   the controller selects the first mode or the second mode through the interval average value and calculates the output limit value depending on the selected mode.

5. The system according to claim 3, wherein:
   the output limit modes comprise a first mode, a second mode, and a third mode; and
   the controller converts the fuel cell into the second mode when the interval average value in the first mode is equal to or greater than a first reference value.

6. The system according to claim 5, wherein:
   the controller converts the fuel cell into the first mode when, in the second mode, a reference time after conversion into the second mode is equal to or longer than a first reference time.

7. The system according to claim 3, wherein:
   the output limit modes comprise a first mode, a second mode, and a third mode; and
   the controller converts the fuel cell into the third mode when the interval average value in the first mode or the second mode is equal to or greater than a second reference value.

8. The system according to claim 7, wherein:
   the controller converts the fuel cell into the third mode when, in the first mode or the second mode, a reference time until the current point in time after starting to operate the fuel cell is equal to or longer than a second reference time and the cumulative average value is equal to or greater than the second reference value.

9. The system according to claim 7, wherein:
   the controller returns the fuel cell to the first mode or the second mode when, in the third mode, the cumulative average value is decreased to a third reference value or less.

10. The system according to claim 1, wherein:
    the controller variably derives the output limit value of the fuel cell through a parameter accumulated by use of the fuel cell.

11. The system according to claim 1, wherein:
    the output limit value of the fuel cell is decreased as a parameter accumulated by use of the fuel cell is increased.

12. The system according to claim 1, wherein:
    the controller is configured to provide a plurality of cycle sections divided by a parameter accumulated by use of the fuel cell, and the output limit value is set differently depending on each of the cycle sections.

13. The system according to claim 10, wherein the parameter is a cumulative amount of hydrogen consumed of the fuel cell.

14. The system according to claim 10, wherein the parameter is any one of a cumulative power generation capacity of the fuel cell, a cumulative amount of water generated by the fuel cell, or a cumulative amount of air consumed of the fuel cell.

15. A method for operating a fuel cell, the method comprising:
    deriving, by a controller, an interval average value corresponding to an average of output values of the fuel cell every designated time;
    deriving, by the controller, a cumulative average value corresponding to an average of the output values of the fuel cell until a current point in time after starting to operate the fuel cell;
    deriving, by the controller, an output limit value of the fuel cell through the interval average value and the cumulative average value; and
    controlling, by the controller, operation of the fuel cell based on the derived output limit value.

* * * * *